May 11, 1937.　　　D. J. DIEL　　　2,080,354
LAWN MOWER
Filed Sept. 29, 1934
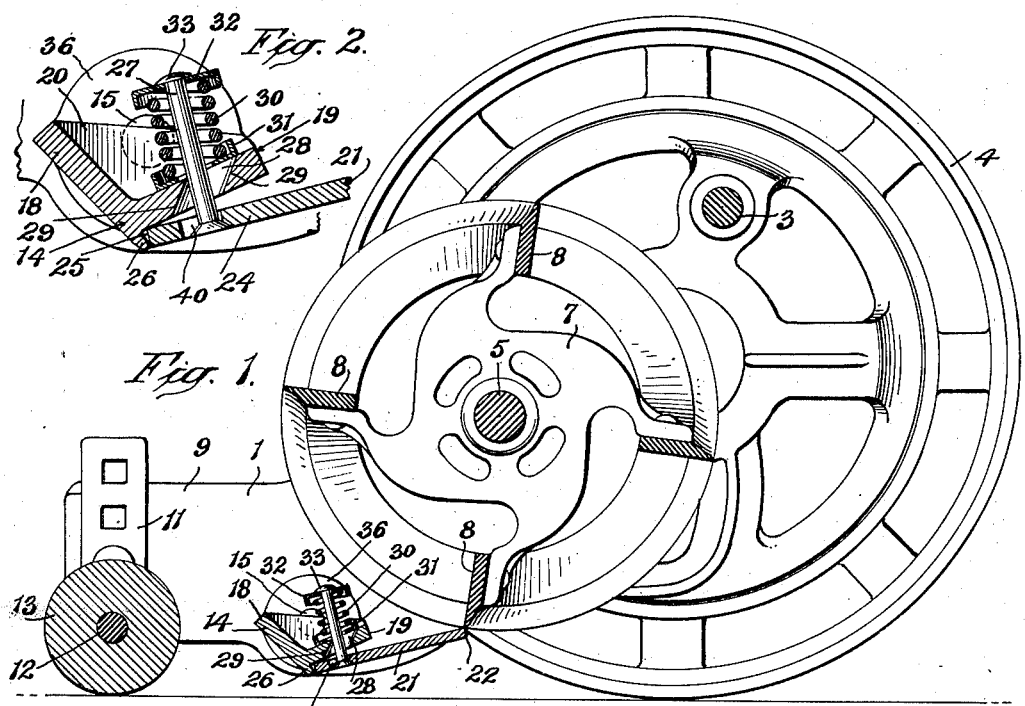
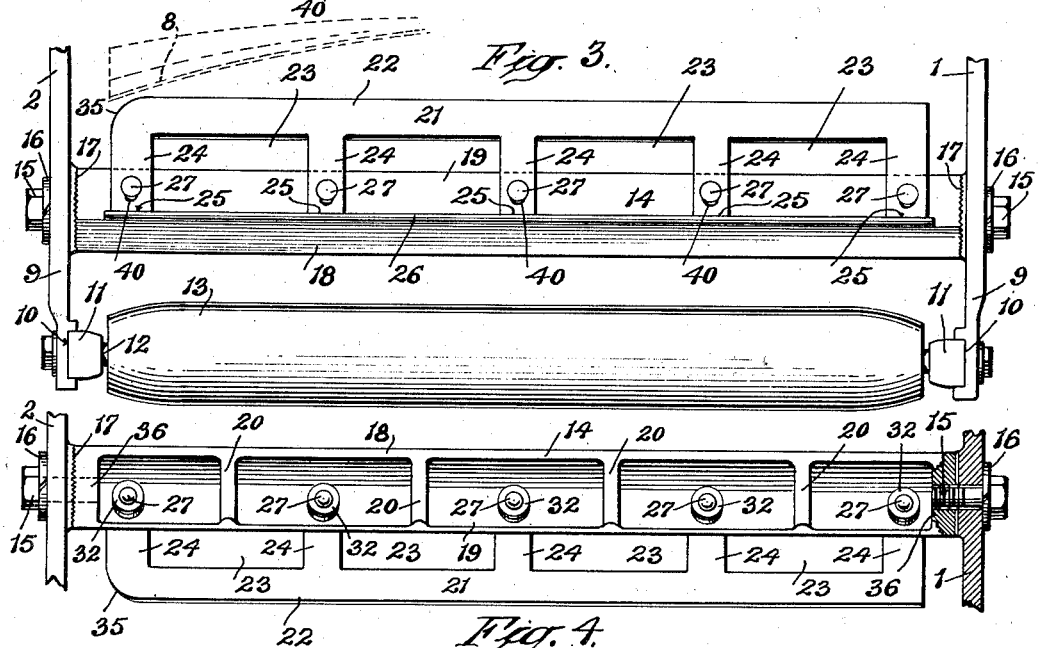
INVENTOR
Daniel J. Diel
BY
Harry Radzinsky
ATTORNEY Patented May 11, 1937

2,080,354

UNITED STATES PATENT OFFICE 2,080,354

LAWN MOWER

Daniel J. Diel, New York, N. Y.

Application September 29, 1934, Serial No. 746,121

5 Claims. (Cl. 56—294)

This invention relates to an improvement in lawn mowers, and has for its object to improve the cutting operation thereof, to obviate the use of present day cutting blade adjustments, and to provide as far as possible a trouble-proof mechanism resulting in greatly increased cutting efficiency.

These results are attained by an improved resilient means of mounting the normally fixed cutting bar or blade, which is, according to the improvement, mounted for free, resiliently-urged movement in several directions relative to the rotating cutters. I am aware that in the past, efforts have been made to resiliently urge, by means of springs, the normally fixed cutting bar or blade toward the rotating cutters, but these prior constructions have been deficient in many ways. In most cases, the cutting bar has been pivotally supported on a fixed rod or pivot pin and was spring-pressed at widely spaced points, usually at or near its opposite ends, to direct it toward and into contact with the rotating cutters. With such an arrangement, the cutting bar was adjustable only within a limited arc, and it required the precise setting of adjusting screws, to secure the proper shearing action and to compensate for wear. The points at which the spring pressure was imposed were usually widely spaced so that an equalized distribution of spring pressure for the full length of the blade was absent. Furthermore, these prior constructions were such that they required special formation or shaping of the lawn mower frames and other parts and therefore did not permit of their easy installation in lawn mowers of conventional construction.

This invention therefore seeks to remedy these deficiencies; it provides a spring-mounted cutting bar which may be easily substituted in place of the normally fixed cutting bar in conventional use with no or little material change in the lawn mower construction; and it provides a non-adjustable, trouble-free cutting mechanism requiring no care on the part of the user and resulting in greatly increased cutting efficiency.

More specifically, the invention contemplates the provision of a movably mounted cutting bar, wholly supported on and by a plurality of uniformly spaced coil springs which surround studs extending through and projecting upwardly from the cutting bar and passing through angularly-ended slots formed in a fixed supporting bar on which the springs rest. By this arrangement, the cutting bar is resiliently held in contact with the rotary cutting blades during rotative operation thereof and with correct pressure exerted thereon, and an effective shearing operation is thus attained.

The accompanying drawing, wherein an embodiment of the invention is shown, Fig. 1 is a transverse sectional view through a lawn mower provided with the improved construction; Fig. 2 is an enlarged transverse sectional view through the fixed supporting bar and the cutting bar supported therefrom, showing one of the spring mountings; Fig. 3 is a view of the underside of the cutter bar, showing its support and adjacent parts of the lawn mower structure; and Fig. 4 is a plan view, with parts in section, of the cutter bar and its support.

In the drawing, 1 and 2 indicate the conventional side frame members of the lawn mower; these frame elements being held and braced in spaced-apart relationship by cross rods 3 in the usual way. The wheels 4 are also of conventional form and mounting, and suitable gearing or other driving means serves to drive the shaft 5 carrying the spider 7 on which the spiral cutting blades 8 are carried. The frame members 1 and 2 are provided with rear extensions 9 which are recessed at 10 to receive the vertically adjustable bearings 11 which receive the axle 12 of the wooden roller 13. The elements thus far described are all of standard construction and form no part of the invention.

Mounted between the side frames 1 and 2 is a fixed supporting bar 14 which has end walls 36 threaded to receive bolts 15 extending through the side frames 1 and 2. Lock washers 16 are received on the bolts 15 so that when the bolts are securely tightened, rotative movement of the fixed supporting bar 14 about its longitudinal axis is prevented. To further prevent such rotative shifting of the bar 14, it may be found advisable to roughen or serrate the contacting faces of the ends 36 of the bar and the side frames, as indicated at 17 in Figs. 3 and 4.

The fixed supporting bar 14 is of angular cross-sectional shape and is thus formed with an upwardly extending or substantially vertical web 18 and a substantially horizontal web 19, and is reinforced at uniformly spaced points by the transverse webs 20. At 21 is shown the cutting bar or blade which has its forward edge portion 22 resiliently held in co-operative shearing contact with the edge of one or the other of the spiral rotating cutting blades 8 at all times. The cutting bar or blade 21 is provided with spaced apertures 23 which serve to increase the flexibility of the blade and incidentally permit the passage of small stones and other impediments which would otherwise possibly clog the mower. Located between the apertures 23 are the integral strip portions 24 which have their inner ends 25 held in constant abutment against a rib 26 integrally formed on and extending longitudinally of the bar 14 at the junction of its vertical and horizontal webs 18 and 19 respectively.

Extending through elongated openings 40 formed in and projecting vertically upward from each of the strip portions 24 is a stud 27, each of these studs passing through a slot 28 provided in the horizontal web 19 of the fixed supporting bar 14. The openings 40 are elongated to permit angular or rocking movement of the studs 27. The slots 28 are provided at uniformly spaced points in the horizontal web 19 of the bar between the transverse reinforcing webs 20 therein, as clearly shown in Fig. 4. Each slot 28 has beveled or inclined ends 29 to permit an angular movement of the studs 27 under pressure of a spring 30 which surrounds the upper portion of the stud and has its lower end resting in a cup-shaped seat 31 supported on the upper face of the horizontal web 19 of the bar 14, and its upper end bearing against a cap 32 restrained against upward movement by the head 33 on the upper end of the stud.

From the foregoing, the operation of the improved lawn mower structure will be readily understood. The pressure of the springs 30 is such that they act to hold the cutter bar 21 in resilient contact with the revolving cutters during operation of the mower. The pressure of these springs is, by their uniform spacing, equally distributed over the length of the cutter bar, so that warpage and distortion of the cutter bar is avoided. By the manner in which the cutter bar is spring suspended, it can adjust itself by transverse movement, to compensate for wear, and accordingly always maintain an operative, resilient contact with the revolving cutters. The spring mounting for the cutter bar easily permits the passage of small stones, twigs, etc., between the bar and blades, thus preventing jamming and damage to the blades. The cutter bar, or at least the cutting edge portion thereof, may, if desired, be made of spring steel or other metal, so that slight flexure of the blade will be had when unequal stresses are imposed upon it by the pressure of the revolving cutters. To facilitate movement of the rotating cutters into contact with the edge of the cutter bar, I provide a rounded or curved end portion 35 at one end of the bar 21. This enables the rotating cutters to easily revolve into impingement with the operative edge 22 of the blade and avoids sharp corner contact which would either cause jamming or else damage to the sharpened edges of the revolving cutters.

It will be noted that the structure is one which may be easily substituted for the fixed cutter bar in use on the conventional type of lawn mower, without requiring structural changes in the mower. That is to say, the ordinary fixed cutter bar is removed and the new structure placed in position. When once set in place and positioned by proper rotative setting of the bar 14, so that the springs 30 are compressed to the requisite degree to hold the edge 22 of the cutter bar with the correct resilient pressure against the revolving cutters, no further adjustment is necessary, and the device will give hard service and long wear.

What I claim is:

1. In a lawn mower, rotary cutters, a supporting bar, a cutting blade supported on springs resting on and projecting upwardly from the supporting bar, said springs being located at uniformly spaced intervals along the length of the cutting balde to provide uniform spring tension for the entire length of the blade, said cutting blade having a forward edge held by the springs in co-operative shearing relationship with the rotary cutters, the cutting blade having a series of apertures located between the springs to lend flexibility to the blade.

2. A lawn mower provided with a frame, rotating cutters mounted therein, an elongated bar supported by the frame and extending adjacent to and co-extensively with the cutters, said bar having slots extending transversely of it, a cutting blade, studs mounted in the cutting blade and extending upwardly therefrom and projecting through the slots, said slots being elongated transversely of the cutting blade whereby the studs have angular movement within the slots during rotation of the cutters, springs mounted on the fixed bar and surrounding the studs and urging the studs upwardly to cause the cutting blade to be resiliently held against the rotating cutters, the cutting blade being wholly supported on the studs and springs and capable of bodily movement toward the rotating cutters, and stop means located at the back of the cutting blade for preventing bodily shifting movement of said blade away from the cutters.

3. A lawn mower provided with rotating cutters, an elongated fixed bar located adjacent to said cutters, said bar being formed with a plurality of equally spaced elongated slots and having inclined surfaces at the ends of said slots, a cutting blade resiliently supported from and located below the fixed bar, studs supporting and passing through the cutting blade and extending upwardly through the slots and mounted loosely therein whereby they are capable of angular movement in said slots during rotation of the cutters, and spring means engaging the studs and drawing the cutting blade upwardly and into resilient contact with the rotating cutters.

4. A lawn mower provided with rotating cutters, an elongated fixed bar located adjacent to said cutters, said bar being formed with a plurality of equally spaced slots extending transversely of the bar, the bar being formed with inclined surfaces at the ends of said slots, a cutting blade resiliently supported from the fixed bar and disposed beneath the same, studs passing through the cutting blade and extending upwardly through the slots and mounted loosely therein whereby said studs are capable of angular movement in said slots, spring means engaging the studs and thereby supporting and drawing the cutting blade upwardly and into resilient contact with the rotating cutters and a fixed stop at the back of the cutting blade.

5. In a lawn mower, rotating cutters, a cutting blade support, spaced studs extending upwardly through the support, a cutting blade bar loosely mounted on said studs, springs surrounding the studs and resting on the support for supporting the cutting blade and urging the studs upwardly, said support having elongated apertures through which the studs loosely extend and in which the studs have angular movement.

DANIEL J. DIEL.